(12) United States Patent
Rakshit et al.

(10) Patent No.: US 10,755,215 B2
(45) Date of Patent: Aug. 25, 2020

(54) GENERATING WASTAGE ESTIMATION USING MULTIPLE ORIENTATION VIEWS OF A SELECTED PRODUCT

(71) Applicant: international Business Machines Corporation, Armonk, NY (US)

(72) Inventors: Sarbajit K. Rakshit, Kolkata (IN); Priyanka Agrawal, Bangalore (IN); Amrita Saha, Bangalore (IN); Pankaj S. Dayama, Bangalore (IN); Srikanth Govindaraj Tamilselvam, TamilNadu (IN)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 15/928,564

(22) Filed: Mar. 22, 2018

(65) Prior Publication Data

US 2019/0295017 A1    Sep. 26, 2019

(51) Int. Cl.
*G06Q 10/06*  (2012.01)
*G06N 3/08*  (2006.01)

(52) U.S. Cl.
CPC ......... *G06Q 10/06313* (2013.01); *G06N 3/08* (2013.01)

(58) Field of Classification Search
None
See application file for complete search history.

(56) References Cited

U.S. PATENT DOCUMENTS 5,815,398 A * 9/1998 Dighe .................. G06Q 10/043 700/171
8,190,461 B2   5/2012 Hartel et al.
(Continued)

FOREIGN PATENT DOCUMENTS

EP        3561737 A1 * 10/2019 ............... G06N 3/08
WO   WO-2018204410 A1 * 11/2018 ....... G05B 19/41875

OTHER PUBLICATIONS

Geiger, Manfred, Jürgen Knoblach, and Frank Backes. "Cost estimation for large scale production of sheet metal parts using artificial neural networks." University of Erlangen-Nuremberg, institute for manufacturing science. Prod Eng 2 (1998): 81-84. (Year: 1998).*

(Continued)

*Primary Examiner* — Thomas L Mansfield
*Assistant Examiner* — Derick J Holzmacher
(74) *Attorney, Agent, or Firm* — Ryan, Mason & Lewis, LLP

(57) ABSTRACT

Methods, systems and computer program products for wastage estimation are provided herein. A computer-implemented method includes receiving, via a user interface, selection of a product for which an estimation of wastage incurred in manufacture thereof is desired and determining one or more orientation suggestions for the selected product, the one or more orientation suggestions including suggestions for imaging different views of the selected product for use in estimating the wastage incurred in manufacture thereof. The method also includes providing, via the user interface, one or more prompts for imaging the selected product at the one or more orientation suggestions, thereby obtaining images of the selected product, utilizing the obtained images of the selected product to calculate an estimated wastage incurred in manufacturing the selected product, and displaying, via the user interface, a display element indicating the estimated wastage incurred in manufacturing the selected product.

19 Claims, 11 Drawing Sheets

(56) References Cited

U.S. PATENT DOCUMENTS

| | | | |
|---|---|---|---|
| 8,983,806 B2 | 3/2015 | Labrie et al. | |
| 2002/0147502 A1* | 10/2002 | Price | G06Q 10/0631 |
| | | | 700/1 |
| 2003/0158795 A1* | 8/2003 | Markham | G05B 19/41875 |
| | | | 705/28 |
| 2014/0278697 A1 | 9/2014 | Thornberry et al. | |
| 2014/0355839 A1 | 12/2014 | Bridgers et al. | |
| 2015/0066184 A1 | 3/2015 | Bradford et al. | |
| 2016/0232498 A1* | 8/2016 | Tomlin, Jr. | G06Q 30/0206 |
| 2017/0323319 A1* | 11/2017 | Rattner | G06Q 30/0611 |

OTHER PUBLICATIONS

Wang, Qing. "Artificial neural networks as cost engineering methods in a collaborative manufacturing environnnent." International Journal of Production Economics 109.1-2 (2007): 53-64. (Year: 2007).*

Verlinden, Bart, et al. "Cost estimation for sheet metal parts using multiple regression and artificial neural networks: A case study." International Journal of Production Economics 111.2 (2008): 484-492. (Year: 2008).*

Cavalieri, Sergio, Paolo Maccarrone, and Roberto Pinto. "Parametric vs. neural network models for the estimation of production costs: A case study in the automotive industry." International Journal of Production Economics 91.2 (2004): 165-177. (Year: 2004).*

Wang, Tian, et al. "A fast and robust convolutional neural network-based defect detection model in product quality control." The International Journal of Advanced Manufacturing Technology 94.9-12 (2018): 3465-3471. (Year: 2018).*

* cited by examiner

| Description | Jeweler A | Jeweler B | Jeweler C | Jeweler D |
|---|---|---|---|---|
| Weight of Item | 30.00 grams | 30.00 grams | 30.00 grams | 30.00 grams |
| Wastage/Value Addition | 4.50 grams (15%) | 5.40 grams (18%) | 6.60 grams (22%) | 0 grams |
| Chargeable Weight (Gold) | 34.50 grams | 35.40 grams | 36.60 grams | 30.00 grams |
| Rate Per Gram of Gold (INR) | 1,750 /gram Less 50/gram - 1,700 /gram | 1,680 /gram | 1,660 /gram | 1,7770 /gram |
| Making Charges (INR) | 1,500 | 1,200 | NIL | NIL |
| Total Value (INR) | 60,150 | 60,672 | 60,756 | 53,100 |
| Amount Payable (INR) | 60,150 | 60,672 | 60,756 | 53,100 |
| Discount (INR) | 350 | 472 | 456 | NIL |
| Total Paid by Customer (INR) | 59,800 | 60,200 | 60,300 | 53,100 |
| Real Rate Per Gram of Gold (INR) | 1,993.30 | 2,006.65 | 2,010.00 | 1,770.00 |

FIG. 2

GENERATING WASTAGE ESTIMATION USING MULTIPLE ORIENTATION VIEWS OF A SELECTED PRODUCT

FIELD

The present invention relates to design, and more specifically, to techniques for estimating design cost.

BACKGROUND

For various products, the process of manufacturing or producing the products results in scrap or wastage. In automobiles, for example, the processes used for building a given automobile may result in a certain amount of scrap material or other wastage. Similarly, other types of products such as furniture, jewelry, etc. may have varying amounts of scrap material or wastage resulting from manufacturing of such products. Wastage may be financially significant, particularly in products that are made from expensive materials, such as precious metals, cut stones, etc.

SUMMARY

Embodiments of the invention provide techniques for estimating resource wastage resulting from specified end-product designs.

In one embodiment, an exemplary computer-implemented method comprises steps of: receiving, via a user interface, selection of a product for which an estimation of wastage incurred in manufacture thereof is desired; determining one or more orientation suggestions for the selected product, the one or more orientation suggestions comprising suggestions for imaging different views of the selected product for use in estimating the wastage incurred in manufacture thereof; providing, via the user interface, one or more prompts for imaging the selected product at the one or more orientation suggestions, thereby obtaining images of the selected product; utilizing the obtained images of the selected product to calculate an estimated wastage incurred in manufacturing the selected product; and displaying, via the user interface, a display element indicating the estimated wastage incurred in manufacturing the selected product. The steps are carried out by at least one computing device.

In another embodiment, an exemplary computer-implemented method comprises steps of: training a machine learning network using image and wastage data for a plurality of products; obtaining one or more images of a selected product for which an estimation of wastage incurred in manufacture thereof is desired; calculating, utilizing the machine learning network and the obtained images of the selected product, an estimated wastage incurred in manufacturing the selected product; and providing, via a user interface of a user device, a display element indicating the estimated wastage incurred in manufacturing the selected product. The steps are carried out by at least one computing device.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 depicts a table illustrating wastage charges, according to an exemplary embodiment of the present invention.

DETAILED DESCRIPTION

Illustrative embodiments of the invention may be described herein in the context of illustrative methods, systems and devices for estimating resource wastage. However, it is to be understood that embodiments of the invention are not limited to the illustrative methods, systems and devices but instead are more broadly applicable to other suitable methods, systems and devices.

As described above, the process of manufacturing or otherwise producing various types of products can result in scrap or wastage. Product design can have a significant impact on the amount of scrap of wastage that is generated in producing an end-product (e.g., the amount of scrap for a car or other vehicle design, wastage of material in furniture design, wastage of materials in the manufacture of jewelry or other items that are made from precious metals or cut stones, etc.). For complex product designs, it is difficult to estimate overall wastage efficiently.

Embodiments provide techniques for estimating wastage for a given product or product design, thus allowing users to select or modify product designs to reduce wastage, to select from amongst available products or product designs based at least in part on wastage (e.g., to select product designs with lower wastage to reduce costs), to determine whether product or product designs are accurately priced (e.g., based at least in part on a comparison of estimated wastage for a product design with a wastage charge from a manufacturer or retailer of an end product with the product design), etc. Advantageously, techniques described herein may be used to reduce wastage, provide transparency to end-users in pricing of products having associated wastages, improve product design, etc.

Figure 1:
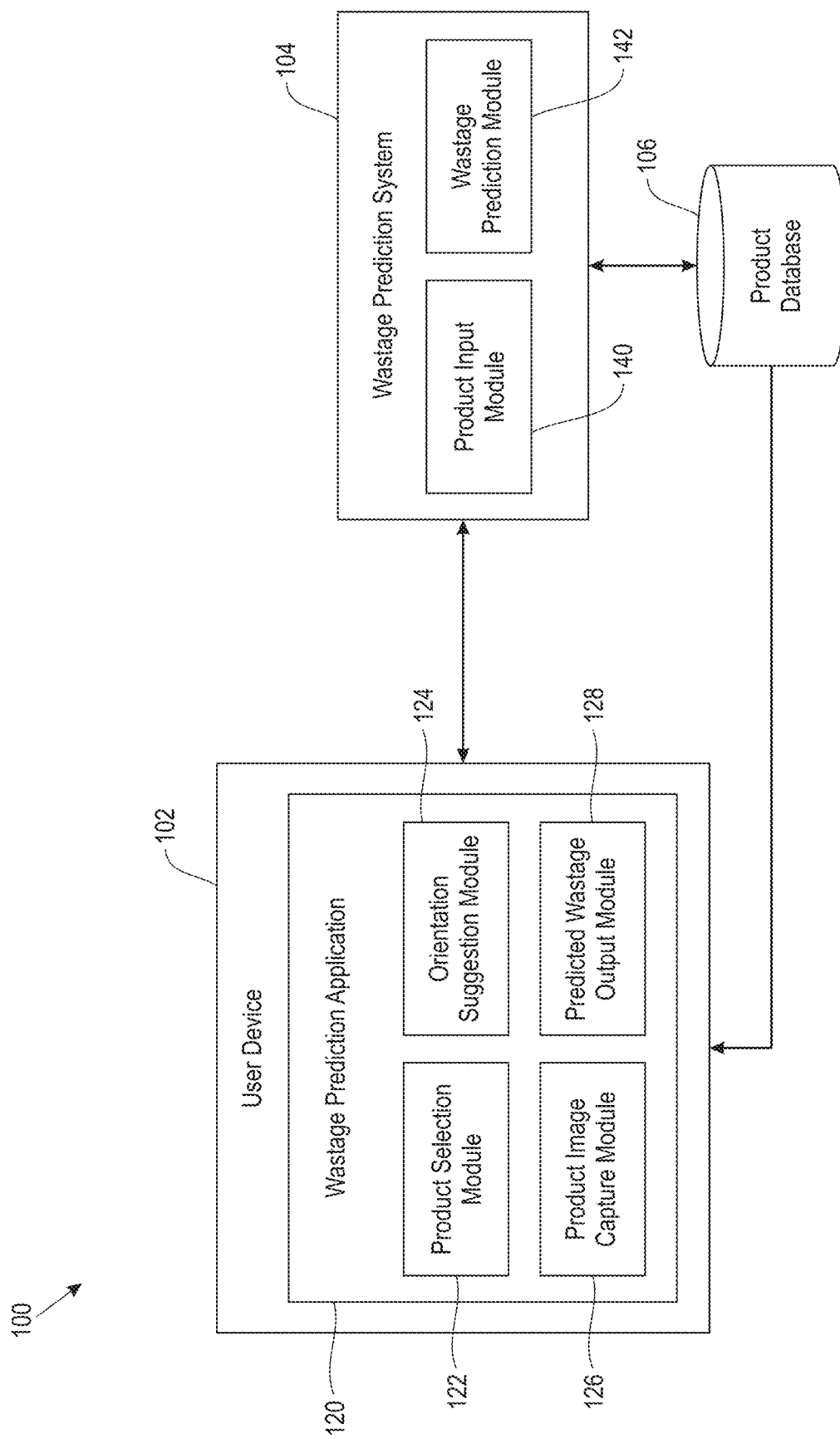
FIG. 1 depicts a system for estimating wastage, according to an exemplary embodiment of the present invention.

FIG. 1 shows a system 100, including a user device 102, a wastage prediction system 104 and a product database 106. The user device 102, which may be a computing device such as a desktop computer, laptop computer, tablet, smartphone or other mobile computing device, etc., implements a wastage prediction application 120. The wastage prediction application 120 is used to capture photos or images of a product or product design from various angles or orientations by providing orientation suggestions to a user of the user device 102. The wastage prediction system 104 utilizes the captured images and structured features of the product or product design to output a wastage estimation for the product or product design.

The wastage prediction application 120 includes a product selection module 122, an orientation suggestion module 124, a product image capture module 126 and a predicted wastage output module 128. The wastage prediction application 120 may be utilized by a user of the user device 102 to obtain estimates of wastage charges for a given product or product design. The product selection module 122 may be used to provide an interface for the user of user device 102 to select a particular product or product design for which a wastage charge estimation is desired. In some embodiments, this may involve inputting certain information regarding a product or product design such as a barcode or other identifier for look up in a database (e.g., such as product database 106 described in further detail below), information regarding materials used in the product or product design, the size or weight of the product or product design, etc. The product selection module 122 in some cases may receive as input a product image (e.g., which may be device-captured using a camera of the user device 102, or may be obtained from another source such as a web page or other application running on the user device 102).

The product selection module 122, in some embodiments, is configured to obtain a product selection automatically. For example, the product selection module 122 may be implemented as an extension of a web browser or other application running on the user device 102. On detection that the web browser or other application is visiting a product web page, the product selection module 122 may automatically identify one or more products associated with the product web page as the selected product for which a wastage charge estimation is to be computed. In other embodiments, the product selection module 122 may provide an interface which is invoked by an end user to select a particular product.

On receiving selection of a product for which a wastage charge estimation is to be computed, the wastage prediction application 120 may determine whether additional information is needed for computing the wastage charge estimation. In some cases, the selected product may be one for which information needed to compute the wastage charge estimation, such as product images and product metadata, is already available (e.g., in product database 106). In such cases, the wastage prediction application 120 may provide such information to the wastage prediction system 104 to obtain the wastage charge estimation, which is output on a display of the user device 102 via predicted wastage output module 128.

In other cases, additional information may be needed for the selected product in order to compute the wastage charge estimation. In such cases, the wastage prediction application 120 may utilize orientation suggestion module 124 to analyze a selected product and provide a list of suggested orientations or views of the product which may be used in computing the wastage charge estimation. The wastage prediction application 120 may provide such information via prompts on a display of the user device 102 to capture additional images of the selected product using product image capture module 126. The product image capture module 126, for example, may utilize a camera of the user device 102 to obtain images of the suggested orientations or views of the selected product that are provided by orientation suggestion module 124.

Once the information needed to compute the wastage charge estimation is obtained, the wastage prediction application 120 invokes a wastage prediction system 104 to compute the wastage charge estimation. Although shown as external to the user device 102 in the system 100, it is to be appreciated that in some embodiments the wastage prediction system 104 may be implemented at least in part internal to the user device 102. For example, the wastage prediction system 104 may be embodied as additional modules within the wastage prediction application 120. In other cases, the wastage prediction system 104 may be implemented on another computing device or processing platform (e.g., a cloud computing platform) which performs the wastage charge estimation computations and provides results back to the wastage prediction application 120 of the user device 102.

The wastage prediction system 104 includes a product input module 140, which obtains information regarding a selected product from the wastage prediction application 120 and/or the product database 106. Such information, as described above, may include product identifiers and metadata, images of different orientations or views of a product, etc. The wastage prediction system 104 further includes a wastage prediction module 142, which computes the wastage charge estimation for the selected product. As will be described in further detail below, the wastage prediction module 142 may utilize an image understanding network, or a machine learning network configured to compute wastage charge estimations based on the input. The machine learning network may include a convolutional neural network (CNN) or other deep learning network.

The product database 106, as indicated above, may store information regarding various products, including but not limited to product metadata and product images (e.g., including images of different orientations or views of one or more products). The product database 106 is shown in system 100 as being external to both the user device 102 and wastage prediction system 104, but this is not a requirement. In other embodiments, the product database 106 may be implemented at least partially internal to one or both of the user device 102 and wastage prediction system 104.

A wastage charge is an amount that is charged to a customer for the "wastage" caused in manufacturing or otherwise producing an end product. Wastage charges are commonly applied in various industries, such as in manufacturing jewelry. For example, manufacturing processes involved in producing a jewelry product may include cutting, soldering, melting, etc., which results in wastage or an amount of scrap material. For certain products, the wastage or amount of scrap material may represent a significant cost, as the materials used (e.g., precious metals and stones) are costly. In the context of jewelry, wastage charges may vary from 10% to 18% of the cost of a product, and may be as high as 20% to 24% in some instances. From a customer perspective, it is difficult to determine why certain pieces of jewelry have more wastage than others (as claimed by the jeweler). Further, in many cases there is a lack of, or insufficient, standards for estimating wastage costs—that is, the determination of wastage costs may be under the discretion of the manufacturer. Thus, there is a need for an automated system to predict wastage charges, given input regarding a product design or an image of a final product. Predicted wastage charges can be used to provide various improvements and advantages, such as in cutting down on material waste, reducing cost, providing transparency in pricing, etc.

FIG. 2 shows a table 200, illustrating the differences in wastage charges for a particular piece of jewelry (e.g., a gold necklace) that is available from four different jewelers denoted A through D. The table 200 illustrates information such as the weight of the necklace (in grams), the wastage or value addition resulting from wastage (shown in both grams and percentage), chargeable gold weight (in grams), the rate per gram of gold (in Indian rupees or INR), the total gold value (in INR), the making or manufacturing charges (in INR), the total value (in INR), the amount payable (in INR), the discount (in INR), the total paid by the customer (in INR) and the real rate per gram of gold (in INR).

Figure 3:
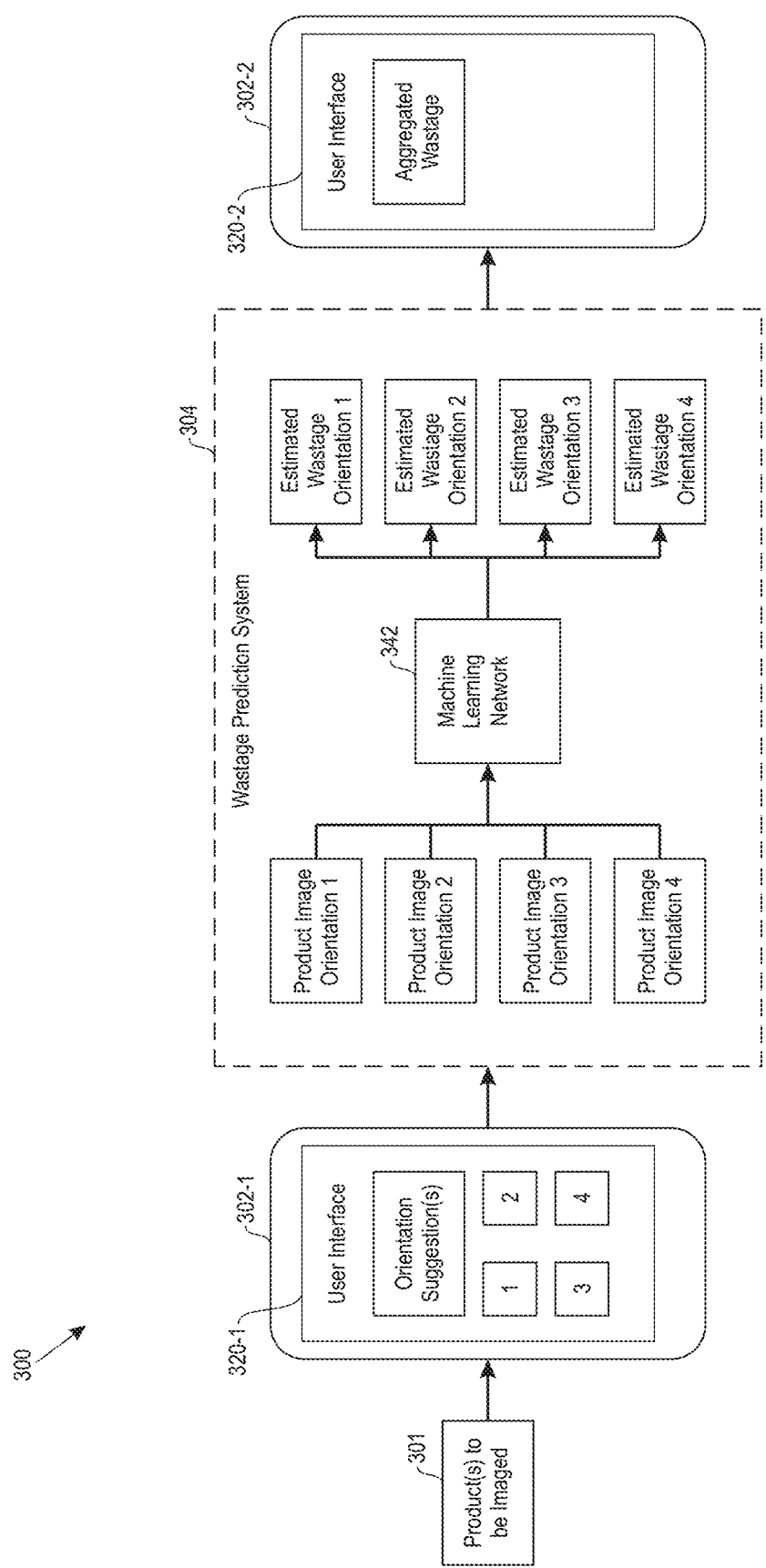
FIG. 3 depicts interfaces for wastage estimation, according to an exemplary embodiment of the present invention.

FIG. 3 shows system interfaces for wastage estimation. One or more products or product designs to be imaged 301 are selected (e.g., provided using product selection module 122 of wastage prediction application 120). Given the input product 301, a user device 302-1 displays via user interface 320-1 one or more orientation suggestions (e.g., provided by orientation suggestion module 124 of wastage prediction application 120). The user device 302-1 captures images of the input product 301 (e.g., using product image capture module 126 of wastage prediction application 120), and provides such images to wastage prediction system 304. The wastage prediction system 304, in this embodiment, implements a machine learning network 342 (e.g., a CNN or other deep learning network) to predict wastage. In some embodiments, each of the input product orientation images is passed through the machine learning network 342 to generate an associated wastage estimation based on that product orientation image. Thus, as shown in FIG. 3, the wastage prediction system provides a number of estimated wastages (e.g., one for each of the input product orientation images). Each input product orientation image may result in a different estimated wastage. Thus, some embodiments may aggregate the estimated wastages for the different orientation images so as to produce an aggregated wastage estimation, which is presented on a display of user device 302-2 via user interface 320-2 (e.g., using predicted wastage output module 128 of wastage prediction application 120). In some embodiments, the wastage prediction system 304 predicts the wastage for each of the input images and aggregates them together to find the total estimated wastage for the input product 301.

Figure 4:
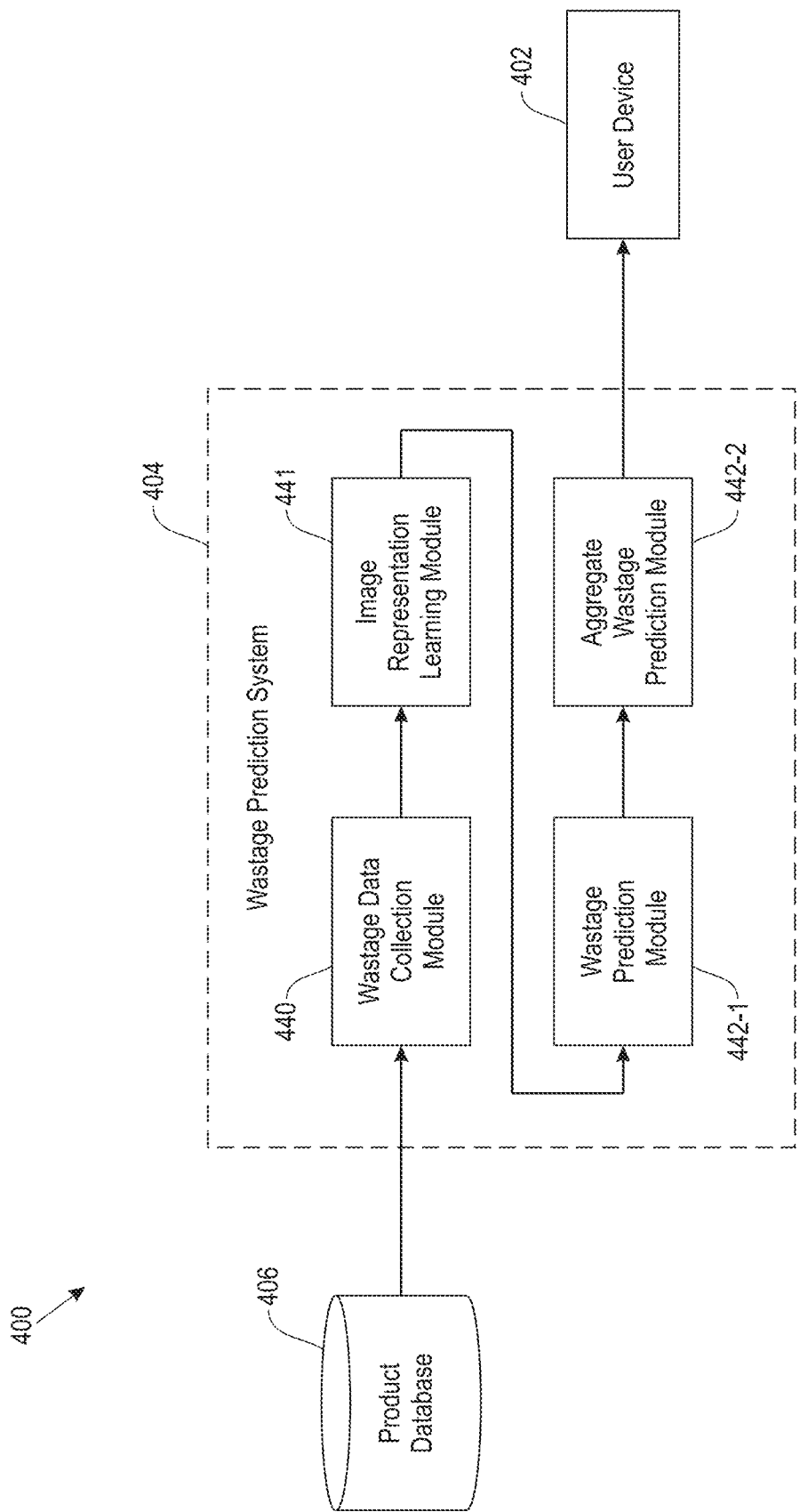
FIG. 4 depicts a wastage prediction system, according to an exemplary embodiment of the present invention.

FIG. 4 shows a detailed view of a wastage prediction system 404. The wastage prediction system 404 includes a wastage data collection module 440, an image representation learning module 441, a wastage prediction module 442-1 and an aggregate wastage prediction module 442-2. The wastage data collection module 440 is configured to collect wastage data and image data for various products. The wastage data, for example, may be obtained by measuring the actual weight of raw material used in manufacture of a given product compared with a weight of the manufactured product. The image data may include images of end-products from one or multiple orientations. A product database 406 may provide the wastage and/or image data to the wastage data collection module 440 as shown in FIG. 4. In other embodiments, the wastage and/or image data may alternatively or additionally be provided to the wastage data collection module 440 from user device 402.

The wastage data collection module 440 provides the wastage and image data to the image representation learning module 441, which is configured to train or learn a compact image representation using one or more machine learning networks, such as a CNN or other deep learning network. An end objective of the training performed by image representation learning module 441 is a trained neural network (e.g., a trained CNN) which provides a regression model to predict wastage given input images of a product or product design. The image representation learning module 441 provides the regression model to the wastage prediction module 442-1. The wastage prediction module 442-1 utilizes the regression model to estimate wastage for a given input image. The wastage prediction system 404 also includes an aggregate wastage prediction module 442-2, which may utilize the input data from wastage data collection module 440 to learn to aggregate wastage predictions from multiple images of the same product into an aggregated wastage production for a given product or product design. The wastage prediction module 442-1 and/or aggregate wastage prediction module 442-2 may be configured to provide wastage estimations and aggregate wastage estimations to user device 402.

Figure 5:
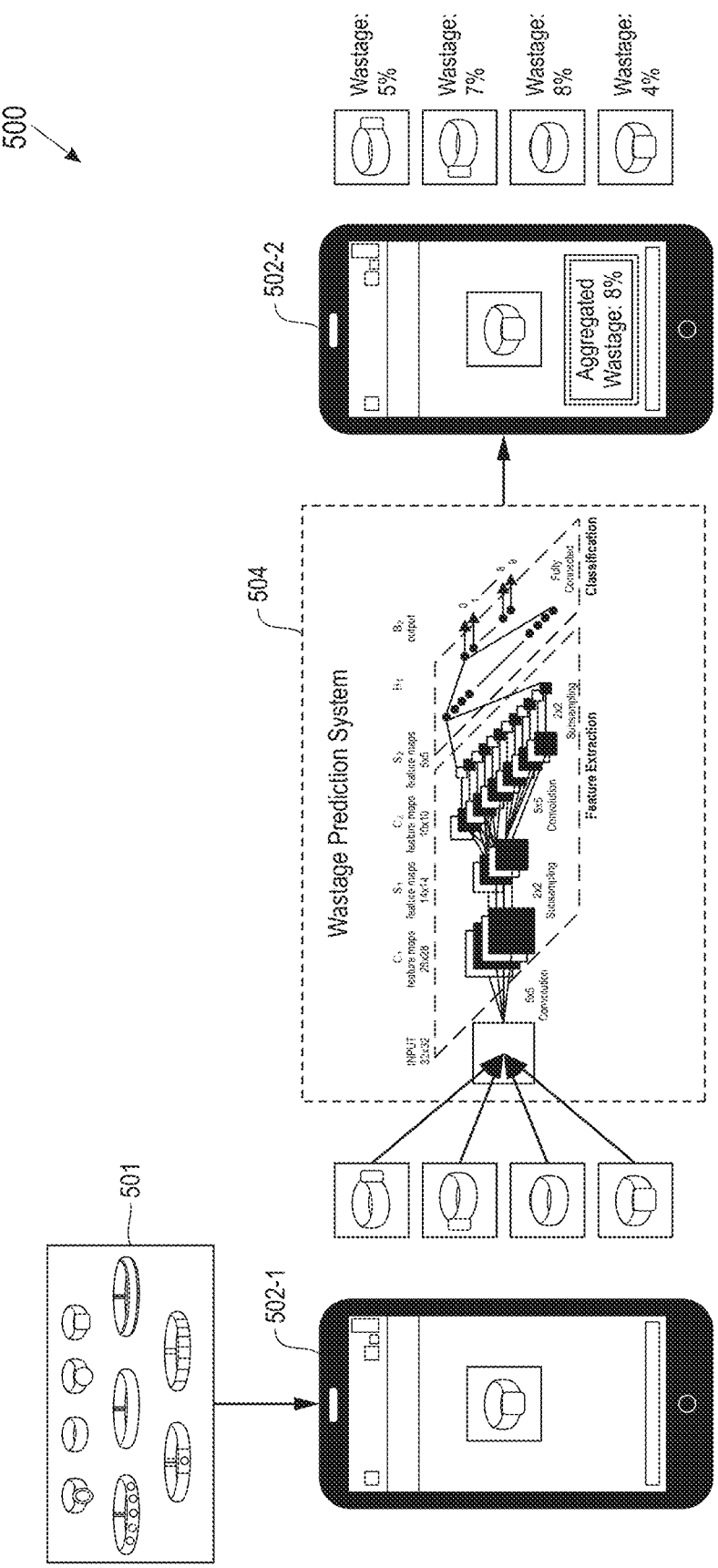
FIG. 5 depicts interfaces in a processing flow for wastage estimation, according to an exemplary embodiment of the present invention.

FIG. 5 shows interfaces of a user device during a processing flow for wastage estimation involving jewelry. It is to be appreciated, however, that embodiments are not limited to use with estimating wastage for items of jewelry. The techniques described herein may be used for estimating wastage of various types of products, including but not limited to automobiles and other vehicles, furniture, etc. The input products 501 in FIG. 5 include jewelry. The user device 502-1 has on its display a particular piece of jewelry (i.e., a ring) for which a wastage estimation is desired. The user of the user device 502-1 is prompted to obtain various images of the ring at different orientations, and such images are provided as input to a wastage prediction system 504.

The wastage prediction system 504 utilizes an image understanding network, or a machine learning network such as a CNN or other deep learning network that is configured to provide wastage estimations for input images. The image understanding network is tuned during training to understand various aspects and design of products through different orientations to accurately estimate wastage. The wastage prediction system 504 provides as output to the user device 502-2 an aggregated wastage estimation for the ring, which is based on wastage estimations for each of the input orientation images supplied to the wastage prediction system 504.

Figure 6:
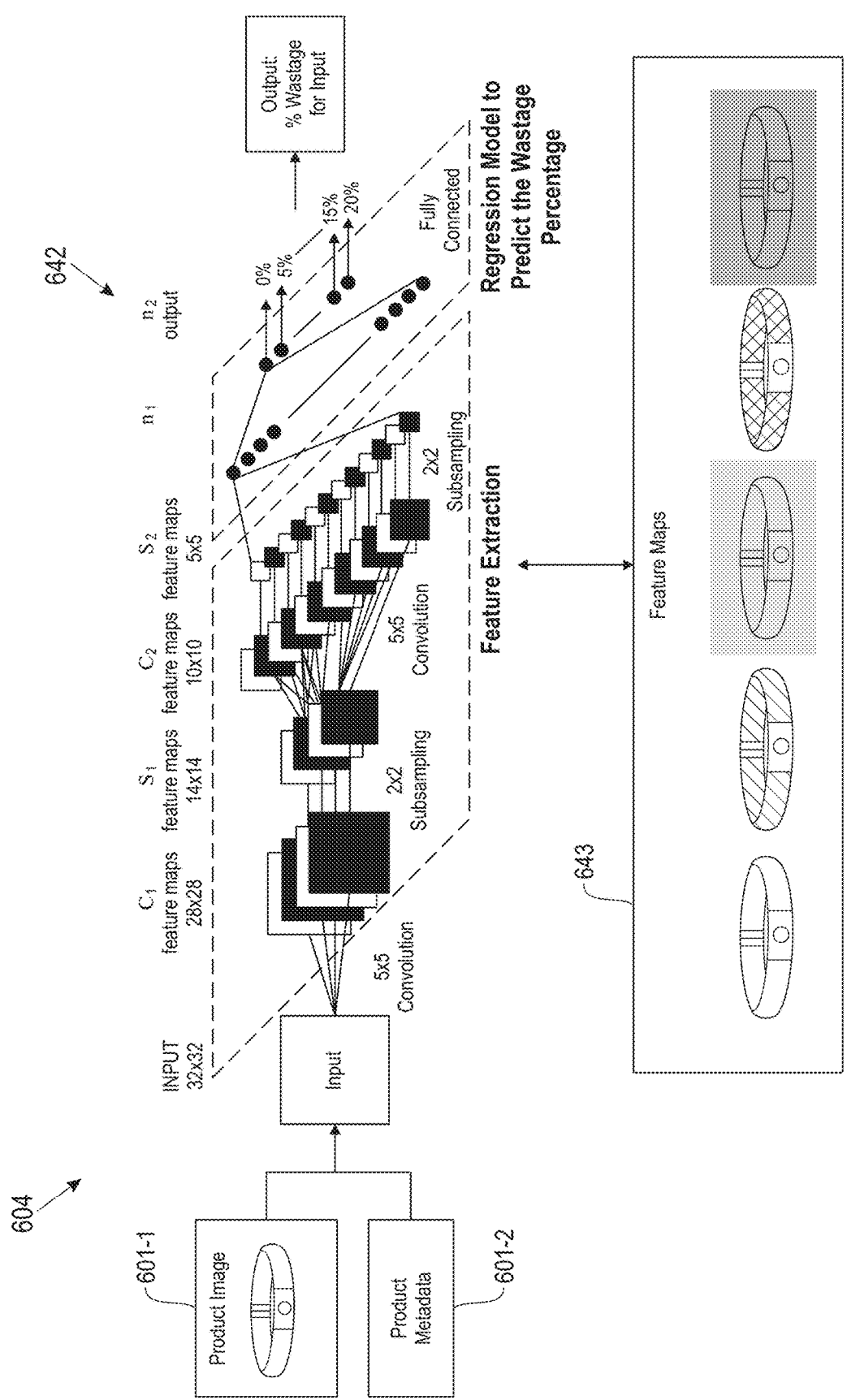
FIG. 6 depicts modeling in a processing flow for wastage estimation, according to an exemplary embodiment of the present invention.

FIG. 6 shows how a regression model is used in a processing flow for generating wastage estimations in a wastage prediction system 604. In this example, wastage prediction is performed using a CNN 642, having a feature extraction stage and a regression model stage for predicting wastage percentages based on input to the CNN 642. The input to the CNN 642 includes a product image 601-1, possibly along with product metadata 601-2. The CNN 642 may have previously been trained, so as to identify or learn different feature maps 643 that are relevant for wastage prediction. The CNN 642 takes the images of the product as input, and extracts semantic feature maps 643 which capture different aspects of the product. These feature maps 643 are input to the regression model to predict the wastage for the product.

In some embodiments, a wastage prediction system (e.g., 104, 304, 404, 504, 604, etc.) takes as input a product or product design selection (e.g., of a piece of jewelry, an automobile or other vehicle, a piece of furniture, etc.) along with images of the selected product or product design. The images, as discussed above, may be captured at different angles or orientations. The images may also include a three-dimensional (3D) image of the product or product design in some embodiments. As output, the wastage prediction system provides an estimation or prediction of the wastage cost for the selected product or product design. Various data may be used by the wastage prediction system in computing the wastage estimations. As described, above, the wastage prediction system may utilize a machine learning network such as a CNN, which may be trained based on various data for related products in a given category. For example, in the case of an automobile, data regarding other automobiles may be obtained from the manufacturer and may include information such as historical data of designs and their corresponding scrap materials produced. In the case of jewelry, data regarding various items of jewelry may be obtained from benchmark or trusted jewelers, from subject matter experts or through simulations, from information regarding historical purchases, etc. Various other data or information may be used in these and other use cases.

An application on a user device (e.g., wastage prediction application 120 on user device 102) may be used to assist a user in providing input data used to calculate wastage estimations. The wastage prediction application 120, for example, may provide user interface features for clicking or otherwise selecting images, automatically applying filters, giving controls for intensity, reducing blur and other picture settings, etc. In some embodiments, the wastage prediction application 120 further analyzes a selected product or product design to suggest orientations or views that best capture different features of the product or product design such that an accurate wastage estimation may be computed.

The wastage estimation application 120, via orientation suggestion module 124, can provide suggestions of orientations or views of a selected product or product design to be used for the wastage estimation computation. The wastage estimation application 120, via product image capture module 126, can assist a user in taking images at the suggested orientations for the selected product or product design needed to predict wastage. The product image capture module 126 may provide prompts to a user with certain angles and focus for images at the suggested orientations. For example, the product image capture module 126 may prompt the user to move the user device 102 or an associated camera to determine a potential set of views or orientations that may be captured. Such information may be provided by product selection module 122 to the orientation suggestion module 124, which utilizes the potential set of views to select the best views or orientations for capturing features of the product or product design needed to compute the wastage estimation. Thus, the product image capture module 126 may automatically identify the best views and prompt the user to capture images of such views via visual display elements on the user device 102 (e.g., through the use of bounding boxes overlayed on a display of a camera or other image capture application on the user device 102). In some embodiments, the orientation suggestions provided by the orientation suggestion module 124 are based on similarity of respective ones of the potential views with an existing training data set containing different views of other products or product designs.

The wastage prediction system can make use of multiple views of a product or product design for various purposes, such as in ensuring that an entire product or product design is covered and in making wastage estimation robust to changes in camera position or images taken. Embodiments may use various approaches for processing different orientation images of a product or product design to compute wastage estimation.

In some embodiments, the multiple orientation images of the product or product design are used to generate a 3D representation of the product or product design, which is then used for classification. This approach has two phases: (i) constructing a 3D model from multiple planar images; and (ii) learning representations from a machine learning network such as a CNN or other deep learning model that takes 3D representations as input.

In other embodiments, a wastage prediction system includes a machine learning network or regression model such as a CNN that is trained to learn the wastage for each orientation image separately. Thus, instead of constructing and providing a 3D representation of the product or product design, multiple orientation images of the product or product design may be run through the regression model to determine a wastage prediction or estimation for each input orientation view. Such wastage estimations may be aggregated to provide an overall wastage estimation for the product or product design. Aggregation, in some embodiments, includes averaging the wastage estimations computed for the different input orientation images. In other embodiments, a highest wastage estimation among the wastage estimations computed for the different input orientation images is used as the aggregated wastage estimation. Various other techniques may be used to aggregate the wastage estimations.

Embodiments provide various advantages. For example, use of wastage prediction systems described herein can help improve customer experiences, by providing estimates of wastage to customers improving price transparency. Systems described herein can also allow manufacturers or sellers to improve their processes to reduce wastage, and to obtain estimates to help in planning for manufacturing work. Embodiments also provide advantages for development and design processes, by allowing a product designer to obtain accurate cost estimates for various designs. Wastage estimates may be used to select a design with lower cost, or to select amongst designs from different design studios, etc.

Figure 7:
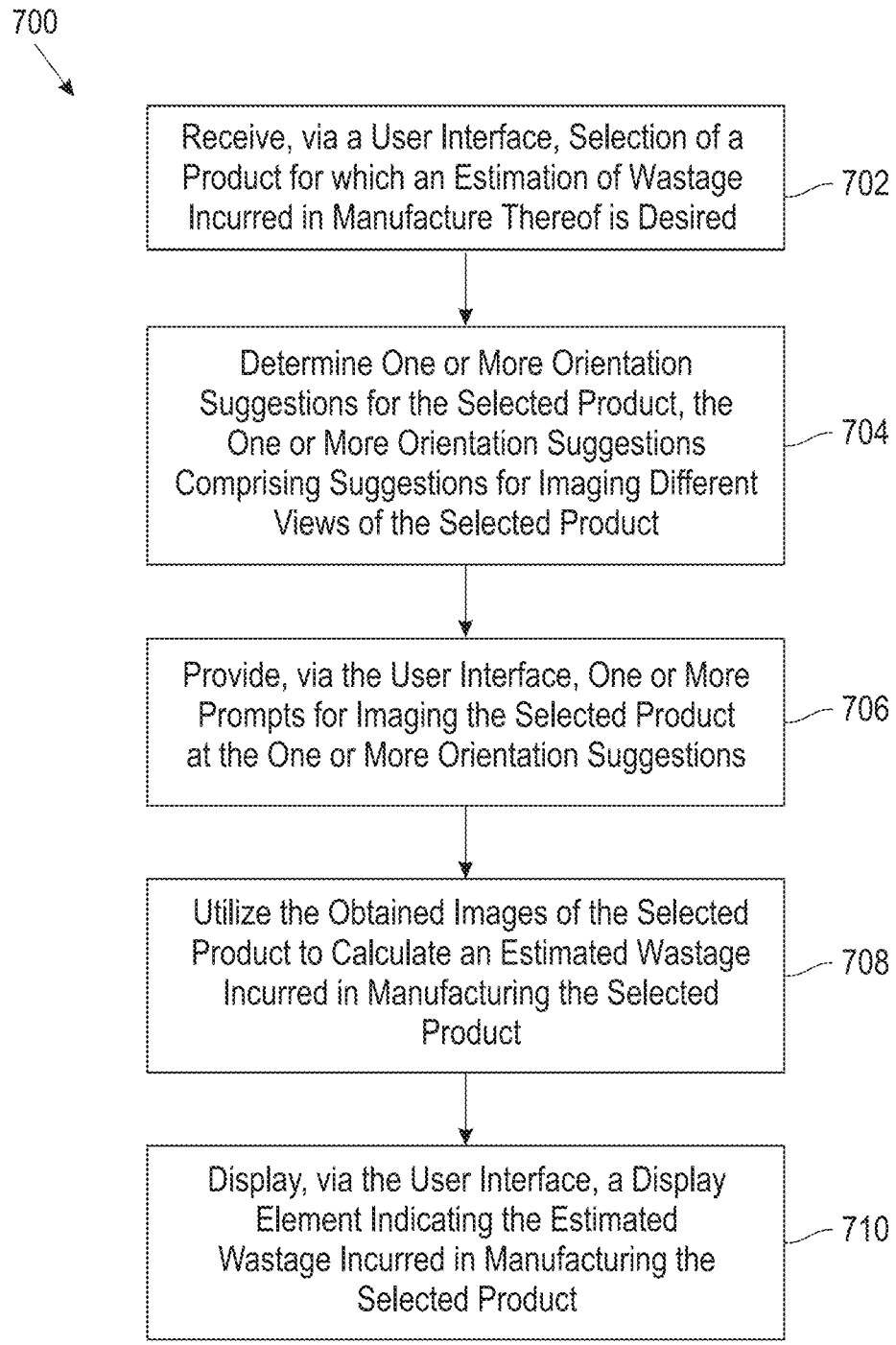
FIG. 7 depicts a process for obtaining information for wastage estimation, according to an exemplary embodiment of the present invention.

FIG. 7 depicts a process 700 for obtaining information for wastage estimation. The process 700 begins with step 702, receiving, via a user interface, selection of a product for which an estimation of wastage incurred in manufacture thereof is desired. In step 704, one or more orientation suggestions for the selected product are determined. The one or more orientation suggestions comprise suggestions for imaging different views of the selected product for use in estimating the wastage incurred in manufacture thereof. In step 706, one or more prompts are provided, via the user interface, for imaging the selected product at the one or more orientation suggestions determined in step 704 thereby obtaining images of the selected product. The obtained images are utilized in step 708 to calculate an estimated wastage incurred in manufacturing the selected product. The estimated wastage incurred in manufacturing the selected product is displayed via the user interface in step 710.

In some embodiments, step 708 comprises utilizing a machine learning network trained using image and wastage data for a plurality of products. The machine learning network may comprise a CNN or other deep learning network. Step 704 may include obtaining a set of potential views of the selected product, identifying views associated with the image data for the plurality of products used to train the machine learning network, and matching a subset of the potential views of the selected product with the identified views associated with the image data for the plurality of products used to train the machine learning network. In some embodiments, step 706 includes overlaying a bounding box on a display of an imaging application on a user device, the bounding box providing an indicator when a potential view of the selected product matches at least one of the orientation suggestions.

The process 700 may further include altering a design of the product selected in step 702, and then repeating the processing in steps 704-710 for the altered design to identify whether the altered design of the selected product reduces the estimated wastage incurred in manufacturing the selected product. In other embodiments, the steps 704-710 may be repeated for each of a plurality of different designs of the product selected in step 702, and the process 700 may further include selecting a given design of the selected product based at least in part on the estimated wastages computed for the plurality of different designs of the selected product (e.g., selecting a design with a lowest estimated wastage cost, etc.).

Figure 8:
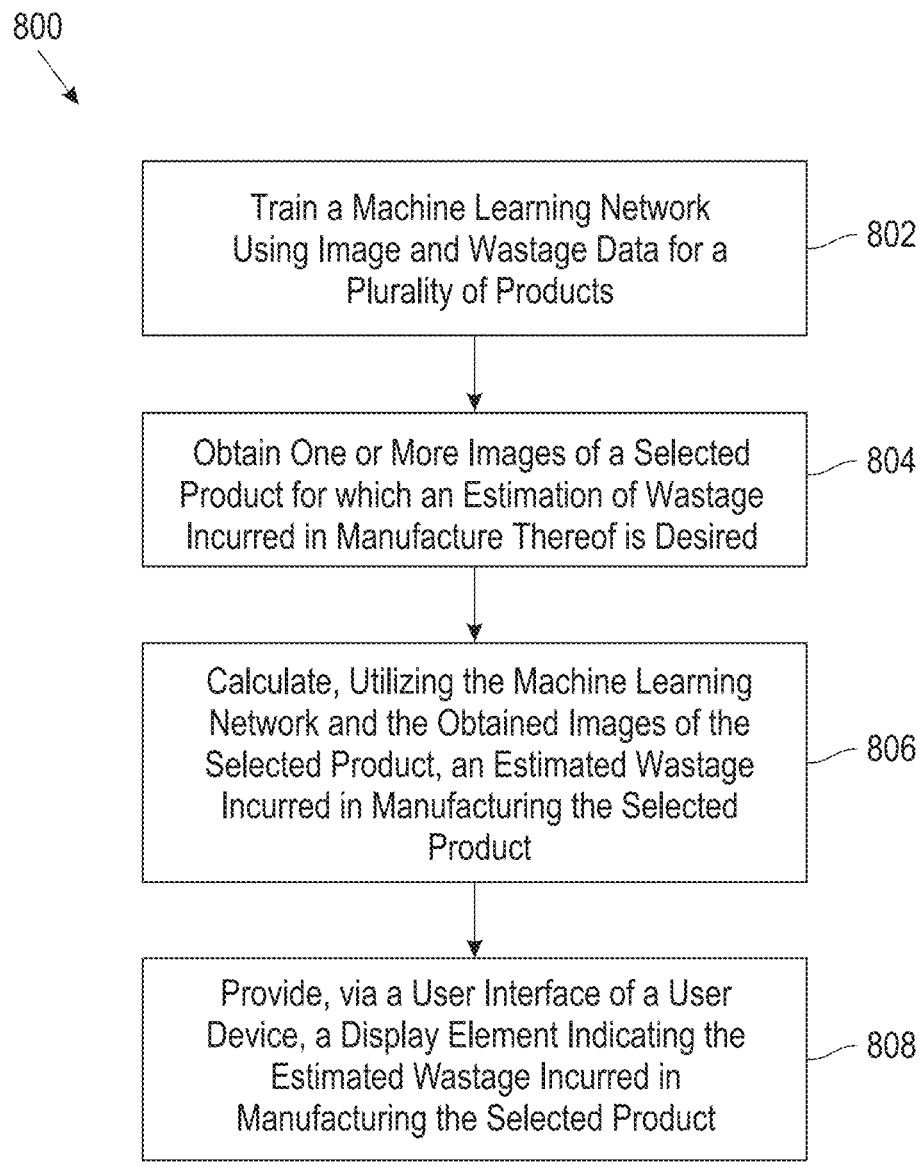
FIG. 8 depicts a process for generating wastage predictions, according to an exemplary embodiment of the present invention.

FIG. 8 depicts a process 800 for generating wastage predictions. The process 800 begins with step 802, training a machine learning network using image and wastage data for a plurality of products. In step 804, one or more images of a selected product are obtained. The selected product is one for which an estimation of wastage incurred in manufacture thereof is desired. An estimated wastage incurred in manufacturing the selected product is calculated in step 806 utilizing the machine learning network and the obtained images of the selected product. In step 808, a display element indicating the estimated wastage incurred in manufacturing the selected product is provided via a user interface of a user device.

In some embodiments, step 802 includes collecting image and wastage data for the plurality of products and generating a regression model for estimating wastage by training a machine learning network using the collected image and wastage data. The machine learning network may be configured to generate estimated wastages for each of two or more different orientation views of a given product. Training the machine learning network in step 802 may comprise generating the regression model to aggregate estimated wastages for each of the two or more different orientation views of the given product to determine an aggregate estimated wastage incurred in manufacturing the given product.

The wastage data used in step 802 may comprise a difference between: (i) a measure of a weight of raw materials used in manufacturing a product; and (ii) a measure of a weight of the manufactured product.

The images obtained in step 804 may comprise two or more planar images of the selected product. Step 806 may include utilizing the two or more planar images of the selected product to generate a three-dimensional representation of the selected product. The machine learning network may be trained in step 802 to estimate wastage based on three-dimensional representations of the plurality of products.

In some embodiments, the machine learning network is trained in step 802 to estimate wastage separately for each of a plurality of different orientation views of the selected product. The estimated wastage provided via the user interface of the user device may comprise an aggregate estimated wastage incurred in manufacturing the selected product determined using the estimated wastages for each of the plurality of different orientation views of the selected product. The aggregate estimated wastage may be determined as an average of the estimated wastages for each of the plurality of different orientation views of the selected product.

Illustrative embodiments provide techniques and systems that may be used in various settings or use case scenarios where a wastage estimation is done by considering an end-product (e.g., an item that has already been manufactured or produced). In some embodiments, the products for which wastage is estimated are complex 3D objects. Systems and techniques described herein allow for automatic selection of different orientations from which a complex 3D object should be photographed or otherwise imaged in order to create a holistic 3D view of the object. Since it is not feasible for an end user to judge this, some embodiments make use of a machine learning network, such as a deep learning model (e.g., a CNN) to identify the orientations or views of an object that are need to compute an accurate wastage estimation.

Once different orientation images or views of an object are captured, such different orientation images may be used in conjunction with structured features to predict an overall wastage percentage (or other wastage measure such as monetary cost, weight of scrap material, etc.). In some embodiments, a predictive model is built using historical data of extracted features and wastage information for known products. The predictive model is then used to make wastage predictions for new products (or for new images of products). In some cases, there are various latent factors which can impact wastage, such as advancements in technology, types of material, etc. Advantageously, machine learning techniques may be used to learn the effects of such latent factors automatically.

Embodiments described herein may be used in a wide variety of application areas, including but not limited to estimating scrap cost for vehicle design, jewelry, furniture, etc. In these and other use cases, the objects to be analyzed are complex and techniques are provided for judging the different orientations from which the objects have to be photographed or otherwise imaged in order to recreate a holistic 3D view or representation of the object. Conventional techniques may assume that a user will provide a relevant set of images, but with complex objects it is not feasible or advisable to rely on end-users to make such judgments. Therefore, systems described herein may automatically determine suggested orientation views needed to estimate wastage for a given object.

Predictive models described herein are learned using historical data to estimate the effect of various parameters on wastage (e.g., latent factors such as technology advancements, material types, etc.). Such predictive models are learned automatically using machine learning techniques, including deep learning techniques such as CNNs. The use of such predictive models provides enhanced accuracy and flexibility compared to techniques which rely on simple look-up tables for wastage estimation.

Embodiments of the present invention include a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
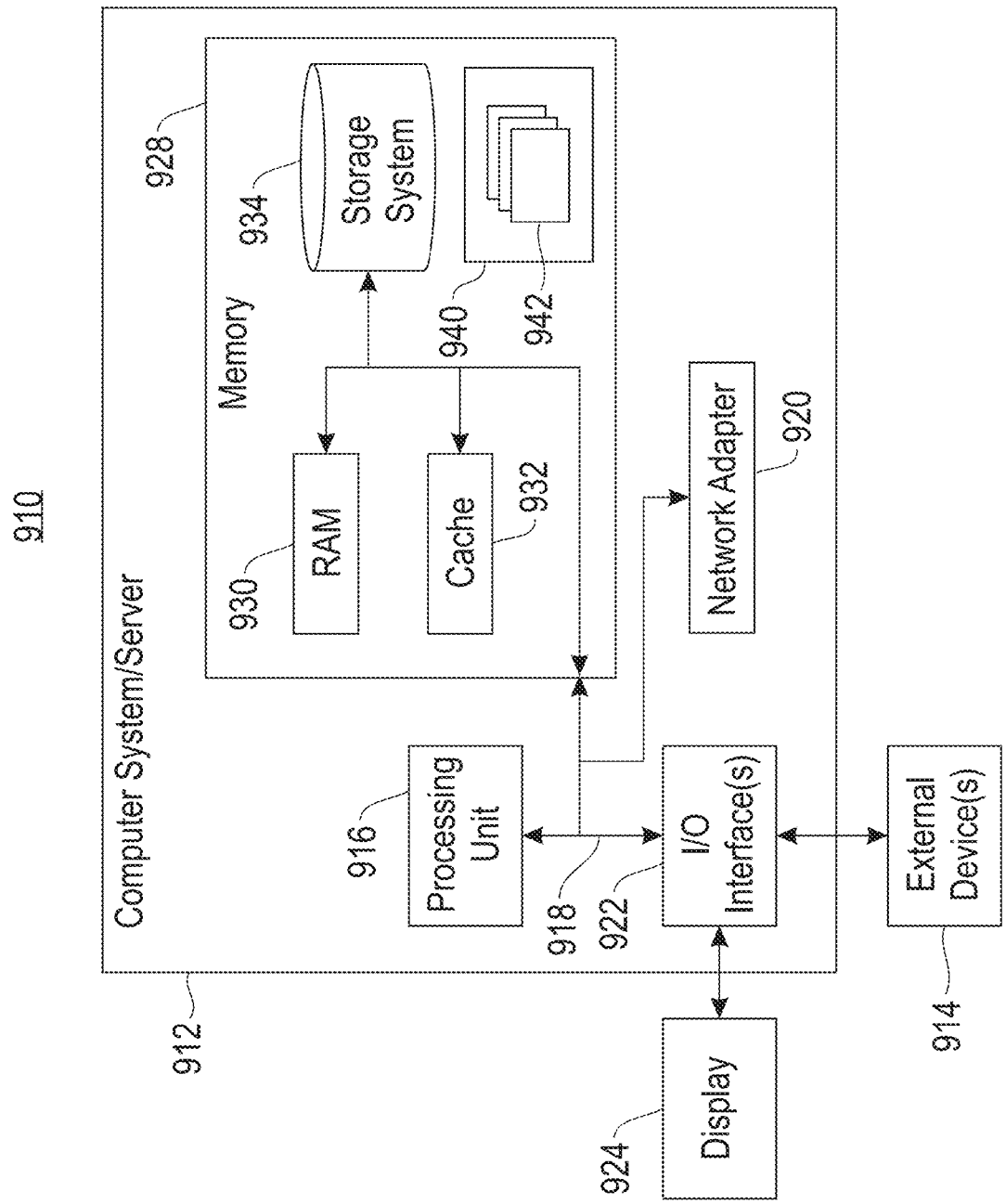
FIG. 9 depicts a computer system in accordance with which one or more components/steps of techniques of the invention may be implemented, according to an exemplary embodiment of the invention.

One or more embodiments can make use of software running on a general-purpose computer or workstation. With reference to FIG. 9, in a computing node 910 there is a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, mobile and wearable devices, and distributed cloud computing environments that include any of the above systems or devices, and the like.

Computer system/server 912 may be described in the general context of computer system executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 in computing node 910 is shown in the form of a general-purpose computing device. The components of computer system/server 912 may include, but are not limited to, one or more processors or processing units 916, a system memory 928, and a bus 918 that couples various system components including system memory 928 to processor 916.

The bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 912 typically includes a variety of computer system readable media. Such media may be any available media that is accessible by computer system/server 912, and it includes both volatile and non-volatile media, removable and non-removable media.

The system memory 928 can include computer system readable media in the form of volatile memory, such as random access memory (RAM) 930 and/or cache memory 932. The computer system/server 912 may further include other removable/non-removable, volatile/nonvolatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 918 by one or more data media interfaces. As depicted and described herein, the memory 928 may include at least one program product having a set (e.g., at least one) of program modules that are configured to carry out the functions of embodiments of the invention. A program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer system/server 912 may also communicate with one or more external devices 914 such as a keyboard, a pointing device, a display 924, etc., one or more devices that enable a user to interact with computer system/server 912, and/or any devices (e.g., network card, modem, etc.) that enable computer system/server 912 to communicate with one or more other computing devices. Such communication can occur via I/O interfaces 922. Still yet, computer system/server 912 can communicate with one or more networks such as a LAN, a general WAN, and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
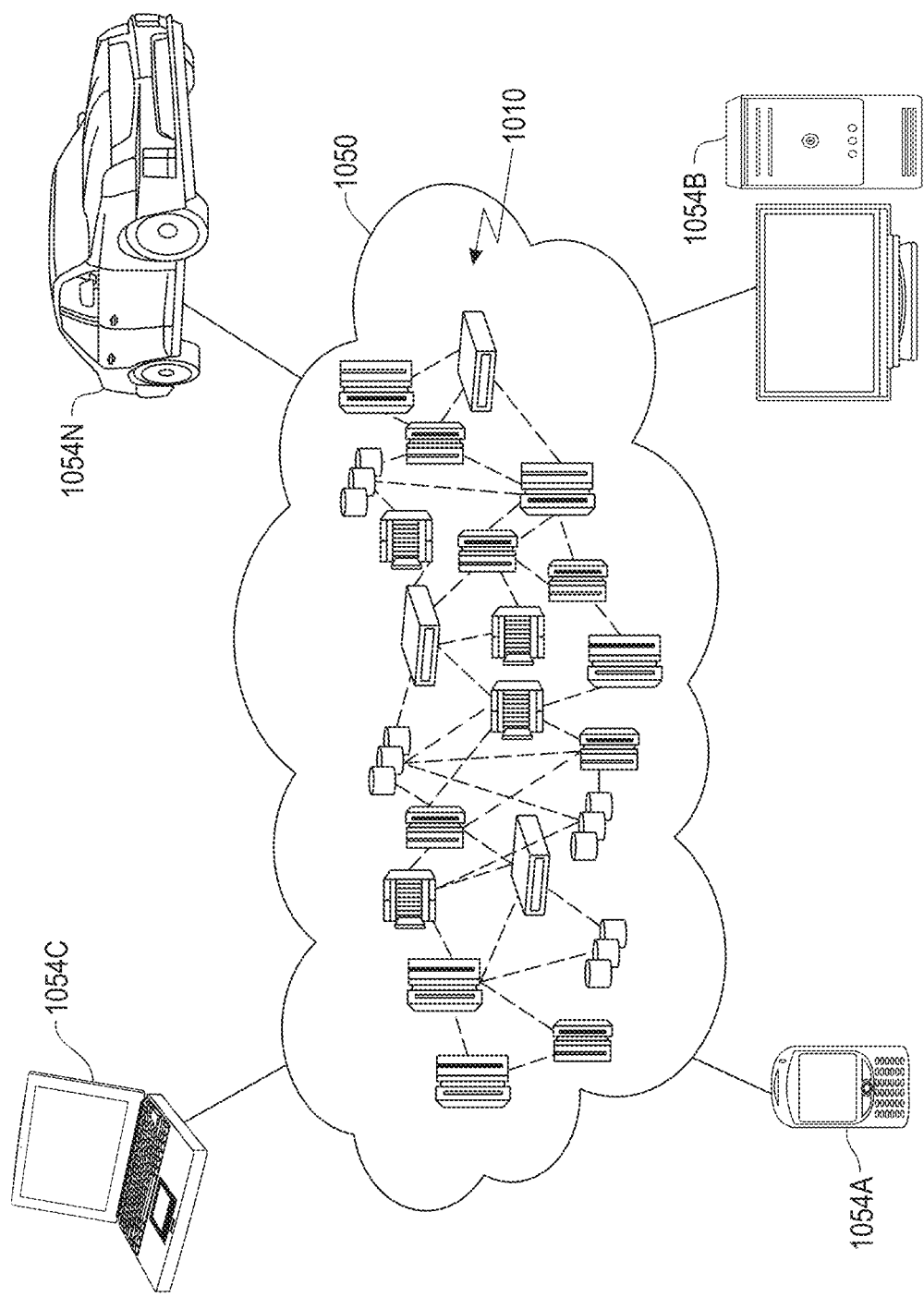
FIG. 10 depicts a cloud computing environment, according to an exemplary embodiment of the present invention.

Referring now to FIG. 10, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
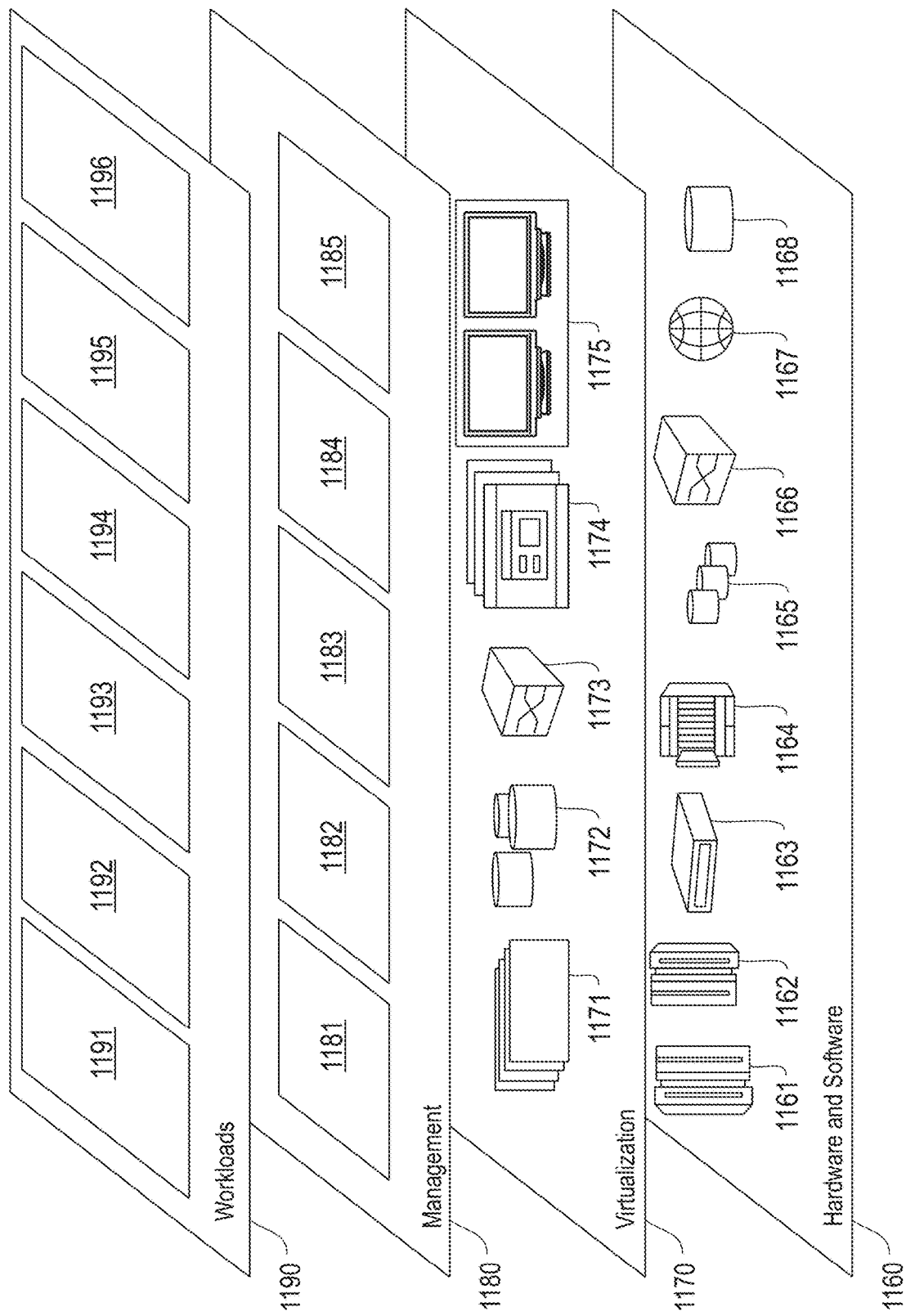
FIG. 11 depicts abstraction model layers, according to an exemplary embodiment of the present invention.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and wastage estimation processing 1196, which may perform various functions described above with respect to wastage estimation techniques described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising steps of:
receiving, via a user interface, selection of a product for which an estimation of wastage incurred in manufacture thereof is desired, wherein the wastage corresponds to a difference between: (i) a measure of weight of raw materials used in manufacturing the product and (ii) a measure of weight of the manufactured product;
determining one or more orientation suggestions for the selected product, the one or more orientation suggestions comprising suggestions for imaging different views of the selected product for use in estimating the wastage incurred in manufacture thereof;
providing, via the user interface, one or more prompts for imaging the selected product at the one or more orientation suggestions, thereby obtaining images of the selected product;
utilizing the obtained images of the selected product as input to a machine learning network trained using image and wastage data for a plurality of other products, wherein the machine learning network calculates an estimated wastage incurred in manufacturing the selected product by one of:
  (i) estimating individual wastages for each of the obtained images and aggregating the individual wastages to obtain the estimated wastage, and
  (ii) constructing a three-dimensional model using the obtained images and calculating the estimated wastage based on the three-dimensional model; and
displaying, via the user interface, a display element indicating the estimated wastage incurred in manufacturing the selected product;
wherein the steps are carried out by at least one computing device.

2. The method of claim 1, wherein the machine learning network comprises a convolutional neural network.

3. The method of claim 1, wherein said determining the one or more orientation suggestions for the selected product comprises:
obtaining a set of potential views of the selected product;
identifying views associated with the image data for the plurality of other products that were used to train the machine learning network; and
matching a subset of the potential views of the selected product with the identified views associated with the image data for the plurality of other products used to train the machine learning network.

4. The method of claim 3, wherein said providing the one or more prompts for imaging the selected product at the one or more orientation suggestions comprises overlaying a bounding box on a display of an imaging application on a user device, the bounding box providing an indicator when a potential view of the selected product matches at least one of the orientation suggestions.

5. The method of claim 1, comprising:
altering a design of the selected product; and
repeating the determining, providing, utilizing and displaying steps to identify whether the altered design of the selected product reduces the estimated wastage incurred in manufacturing the selected product.

6. The method of claim 1, comprising:
repeating the determining, providing, utilizing and displaying steps for each of a plurality of different designs of the selected product; and
selecting a given design of the selected product based at least in part on the estimated wastages computed for the plurality of different designs of the selected product.

7. The method of claim 1, wherein the selected product comprises a jewelry item and the estimated wastage represents a charge resulting from the amount of scrap material generated during manufacture of the jewelry item.

8. The method of claim 1, wherein the selected product comprises a vehicle and the estimated wastage represents a charge resulting from the amount of scrap material generated during manufacture of the vehicle.

9. The method of claim 1, wherein the selected product comprises a furniture item and the estimated wastage represents a charge resulting from the amount of scrap material generated during manufacture of the furniture item.

10. A computer program product, the computer program product comprising a computer readable storage medium having program instructions embodied therewith, the program instructions executable by at least one computing device to cause the at least one computing device to perform steps of:
receiving, via a user interface, selection of a product for which an estimation of wastage incurred in manufacture thereof is desired, wherein the wastage corresponds to a difference between: (i) a measure of weight of raw materials used in manufacturing the product and (ii) a measure of weight of the manufactured product;
determining one or more orientation suggestions for the selected product, the one or more orientation suggestions comprising suggestions for imaging different views of the selected product for use in estimating the wastage incurred in manufacture thereof;
providing, via the user interface, one or more prompts for imaging the selected product at the one or more orientation suggestions, thereby obtaining images of the selected product;
utilizing the obtained images of the selected product as input to a machine learning network trained using image and wastage data for a plurality of other products, wherein the machine learning network calculates an estimated wastage incurred in manufacturing the selected product by one of:
  (i) estimating individual wastages for each of the obtained images and aggregating the individual wastages to obtain the estimated wastage, and
  (ii) constructing a three-dimensional model using the obtained images and calculating the estimated wastage based on the three-dimensional model; and
displaying, via the user interface, a display element indicating the estimated wastage incurred in manufacturing the selected product.

11. A system comprising:
a memory; and
at least one processor coupled to the memory and configured for:
receiving, via a user interface, selection of a product for which an estimation of wastage incurred in manufacture thereof is desired, wherein the wastage corresponds to a difference between: (i) a measure of weight of raw materials used in manufacturing the product and (ii) a measure of weight of the manufactured product;

determining one or more orientation suggestions for the selected product, the one or more orientation suggestions comprising suggestions for imaging different views of the selected product for use in estimating the wastage incurred in manufacture thereof;

providing, via the user interface, one or more prompts for imaging the selected product at the one or more orientation suggestions, thereby obtaining images of the selected product;

utilizing the obtained images of the selected product as input to a machine learning network trained using image and wastage data for a plurality of other products, wherein the machine learning network calculates an estimated wastage incurred in manufacturing the selected product by one of:

(i) estimating individual wastages for each of the obtained images and aggregating the individual wastages to obtain the estimated wastage, and (ii) constructing a three-dimensional model using the obtained images and calculating the estimated wastage based on the three-dimensional model; and displaying, via the user interface, a display element indicating the estimated wastage incurred in manufacturing the selected product.

12. The method of claim 1, wherein the machine learning network calculates an estimated wastage incurred in manufacturing the selected product by constructing the three-dimensional model using the obtained images and calculating the estimated wastage based on the three-dimensional model, and wherein the one or more orientation suggestions for the selected product comprise a plurality of different orientation suggestions that are required to construct said three-dimensional model.

13. The computer program product of claim 10, wherein the machine learning network comprises a convolutional neural network.

14. The computer program product of claim 10, wherein said determining the one or more orientation suggestions for the selected product comprises:

obtaining a set of potential views of the selected product;

identifying views associated with the image data for the plurality of other products that were used to train the machine learning network; and matching a subset of the potential views of the selected product with the identified views associated with the image data for the plurality of other products used to train the machine learning network.

15. The computer program product of claim 14, wherein said providing the one or more prompts for imaging the selected product at the one or more orientation suggestions comprises overlaying a bounding box on a display of an imaging application on a user device, the bounding box providing an indicator when a potential view of the selected product matches at least one of the orientation suggestions.

16. The computer program product of claim 10, wherein the program instructions cause the at least one computing device to perform the steps of:

altering a design of the selected product; and repeating the determining, providing, utilizing and displaying steps to identify whether the altered design of the selected product reduces the estimated wastage incurred in manufacturing the selected product.

17. The computer program product of claim 10, wherein the program instructions cause the at least one computing device to perform the steps of:

repeating the determining, providing, utilizing and displaying steps for each of a plurality of different designs of the selected product; and selecting a given design of the selected product based at least in part on the estimated wastages computed for the plurality of different designs of the selected product.

18. The computer program product of claim 10, wherein the selected product comprises a jewelry item and the estimated wastage represents a charge resulting from the amount of scrap material generated during manufacture of the jewelry item.

19. A computer-implemented method, comprising steps of:

receiving, via a user interface, selection of a product for which an estimation of wastage incurred in manufacture thereof is desired, wherein the selected product comprises a vehicle and the estimated wastage represents a charge resulting from the amount of scrap material generated during manufacture of the vehicle;

determining one or more orientation suggestions for the selected product, the one or more orientation suggestions comprising suggestions for imaging different views of the selected product for use in estimating the wastage incurred in manufacture thereof, wherein said determining comprises: (i) obtaining a set of potential views of the selected product, (ii) identifying views associated with image data for a plurality of other products that were used to train a machine learning network, and matching a subset of the potential views of the selected product with the identified views associated with the image data for the plurality of other products used to train the machine learning network;

providing, via the user interface, one or more prompts for imaging the selected product at the one or more orientation suggestions, thereby obtaining images of the selected product;

utilizing the obtained images of the selected product as input to a machine learning network trained using image and wastage data for a plurality of other products, wherein the machine learning network calculates an estimated wastage incurred in manufacturing the selected product by one of:

(i) estimating individual wastages for each of the obtained images and aggregating the individual wastages to obtain the estimated wastage, and (ii) constructing a three-dimensional model using the obtained images and calculating the estimated wastage based on the three-dimensional model; and displaying, via the user interface, a display element indicating the estimated wastage incurred in manufacturing the selected product;

wherein the steps are carried out by at least one computing device.

* * * * *